United States Patent [19]

Albonetti

[11] Patent Number: 4,828,489

[45] Date of Patent: May 9, 1989

[54] HIGH SPEED FIRING METHOD AND KILN, IN PARTICULAR FOR CERAMIC MATERIALS SUCH AS TILES AND THE LIKE

[76] Inventor: Francesco Albonetti, No. 5/H Via Venturi, Casinalbo (Modena), Italy

[21] Appl. No.: 131,647

[22] Filed: Dec. 11, 1987

[30] Foreign Application Priority Data

Dec. 30, 1986 [IT] Italy .............................. 40146 A/86

[51] Int. Cl.$^4$ .......................... F27D 13/00; F27D 3/12
[52] U.S. Cl. ........................................ 432/5; 432/122; 432/234; 432/236
[58] Field of Search ............... 432/122, 123, 234, 235, 432/236, 5

[56] References Cited

U.S. PATENT DOCUMENTS

| 3,575,395 | 4/1971 | Gentry | 432/234 |
| 3,749,550 | 7/1973 | Suydam | 432/122 |
| 3,792,965 | 2/1974 | Bengtsson | 432/122 |
| 3,887,064 | 6/1975 | Brockmann | 432/122 |
| 4,013,403 | 3/1977 | Petrus | 432/122 |
| 4,102,449 | 7/1978 | Shufran | 432/122 |
| 4,741,695 | 5/1988 | Ushijima | 432/122 |

FOREIGN PATENT DOCUMENTS 183270 12/1980 Italy .

*Primary Examiner*—Henry C. Yuen
*Attorney, Agent, or Firm*—Fay, Sharpe, Beall, Fagan, Minnich & McKee

[57] ABSTRACT

A method, and a kiln, by and in which to fire ceramic tiles (8), or similar items, which are taken along a given path each stage of which is singular in terms of temperature level and other parameters governing the firing cycle. Travelling forward along the path, the tiles are subjected to a succession of alternating forward and reverse movements (30, 31) sequenced in such a way that each passage forward is followed by a shorter movement in reverse.

7 Claims, 2 Drawing Sheets

Fig. 1
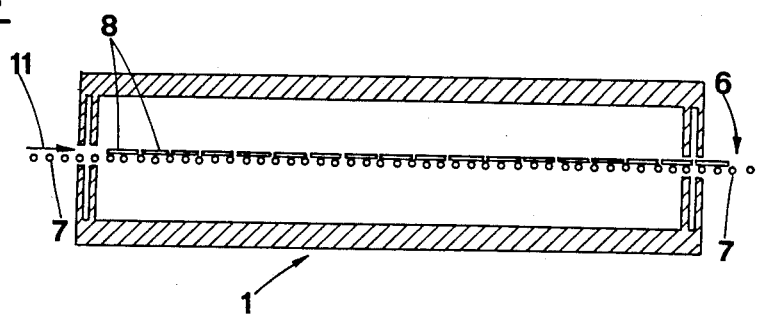
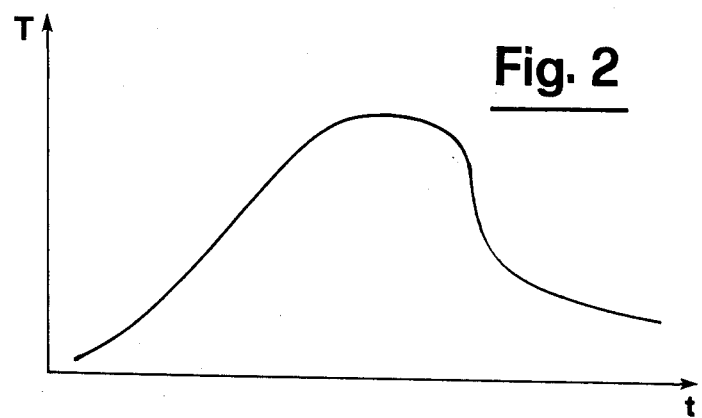
Fig. 2
Fig. 5
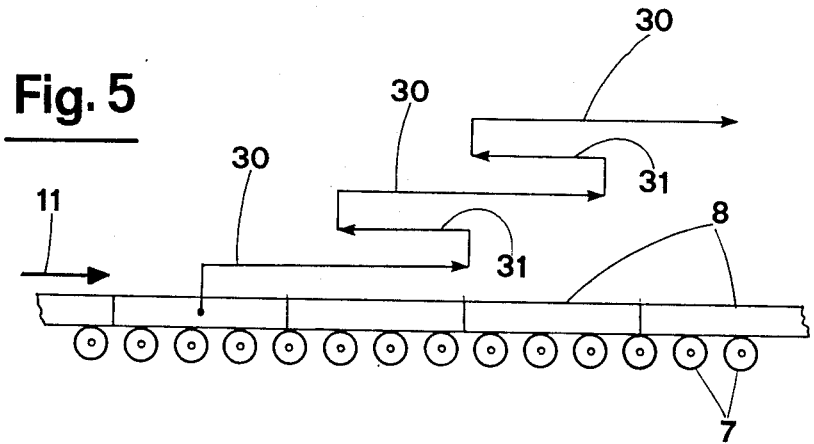

HIGH SPEED FIRING METHOD AND KILN, IN PARTICULAR FOR CERAMIC MATERIALS SUCH AS TILES AND THE LIKE

BACKGROUND OF THE INVENTION

The invention relates to a method of firing ceramic materials, such as tiles and the like, and to a kiln for its implementation.

Such a method is designed for adoption wherever one has a manufacturing process in which ceramic materials, for example ceramic tiles, are conveyed along a predetermined path each stage or zone of which is characterized during operation at regular tempo by the existence of a given temperature level, and it is the collective shape of the various levels that determines the firing cycle.

In conventional firing cycles, as implemented currently in continuous roller kilns, the ceramic material is fired while running through the kiln from end to end. With operation at regular tempo, a precise distribution of temperatues is produced along the longitudinal axis of the kiln; this effect is conventionally termed the "firing curve", a curve which, in practice, represents the entire thermal cycle to which the material put through the kiln is subjected. In conventional kilns, where progress of the material is continuous and uniform, tiles are conveyed steadily through zones held at different temperatures; accordingly, the thermal gradient to which a given type of tile can be subjected without any kind of difficulty occurring will depend, travel speed apart, substantially upon the charactistics of the firing curve—i.e. its steepness, or the degree and duration of the steps it exhibits. A situation such as this imposes a physical limitation that can not be removed, inasmuch as the chosen travel speed dictates that the positive or negative slope of the curve cannot go beyond certain values—more exactly, values beyond which the temperature gradient induced in the material will be such as to inhibit faultless implementation of the process, or worse, to cause damage to the material. The result is that one has a minimum time limit below which the duration of the firing cycle as a whole cannot be allowed to drop.

Accordingly, the object of the invention is to overcome the limitation described above, and speed up the firing cycle.

SUMMARY OF THE INVENTION

The stated object is achieved with a method and a kiln for high speed firing of ceramic tiles and similar material, as described and claimed herein.

The method disclosed is basically of the type whereby material is conveyed along a given path the single stages or zones of which are characterized during operation at regular tempo by the existence of set temperature levels, the combined effect of which determines the firing cycle.

According to the invention, material conveyed along the path is subjected to alternating movement produced as a result of its being propelled forward and backwards by turns; more exactly, each movement forward through a given distance is followed by a comparatively shorter reverse movement, and each such reverse movement then followed in its turn by a comparatively longer movement forward.

BRIEF DESCRIPTION OF THE DRAWINGS

The invention will now be described in detail, by way of example, with the aid of the accompanying drawings; in which:

FIG. 1 is the schematic representation of a first embodiment of a kiln serving to implement the method according to the invention, viewed in longitudinal section through a vertical plane;

FIG. 2 illustrates the time-vs-temperature graph of a thermal cycle as implemented with the kiln shown in FIG. 1, when firing ceramic tiles;

FIG. 5 is a schematic representation of the manner in which tiles are conveyed through the kilns shown in FIGS. 1 and 3.

DESCRIPTION OF THE PREFERRED EMBODIMENTS

Figure 4:
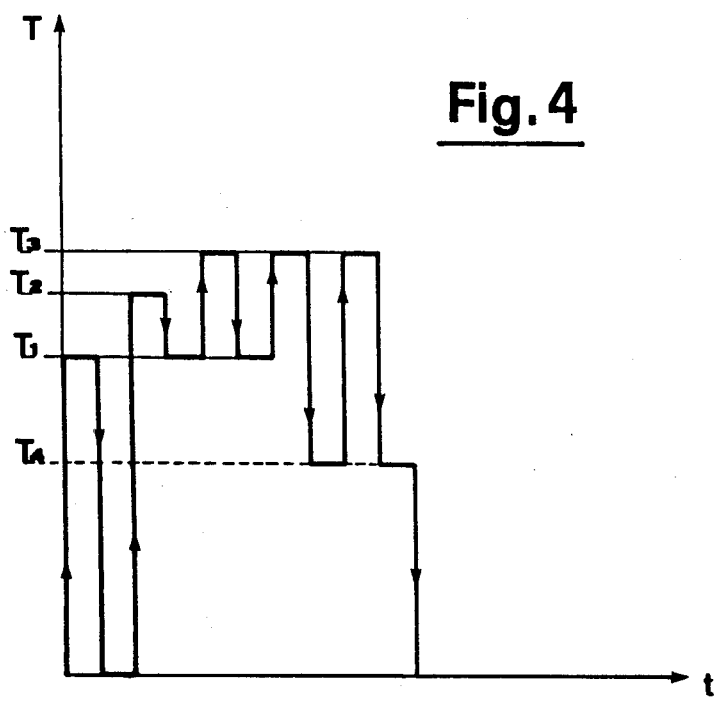
FIG. 4 illustrates the time-vs-temperature graph of a thermal cycle as implemented with the kiln shown in FIG. 3, when firing ceramic tiles.

With reference to the drawings, 1 denotes a kiln (considered in its entirety) suitable for firing ceramic tiles 8 at high speed; the kiln comprises a conveyor system consisting in a table 6 made up of a plurality of power driven rollers 7 disposed side by side with axes parallel in such a way as to form a continuous bed on which the ceramic tiles 8 can sit. Arrow 11 denotes the general direction of movement of the tiles 8 through kiln 1, hence the "forward" rotation of the rollers. The direction indicated by the arrows 11 reflects what is, in effect, the end result of a succession of single forward and reverse movements to which the tiles 8 are subjected; these movements are sequenced in such a manner that each forward passage of the tiles 8, represented by the arrow denoted 30 in FIG. 5, is followed by movement in reverse denoted 31, through a distance less than that of the forward movement, whereupon one has a further passage forward 30 through a distance which is greater than that of the reverse movement 31 just accomplished.

FIG. 2 shows a graph illustrating a thermal cycle such as might be effected on the material—i.e. the tiles 8, in the roller kiln of FIG. 1; T denotes the variation in kiln temperature over a given duration of time t. All other conditions considered par, the overall length of time required to fire the tiles inside the kiln will be determined not only by the shape of the firing curve, but in addition, by the difference between each forward and reverse movement 30 and 31. The feature distinguishing the end-result obtained with this type of curve, as opposed to the conventional high speed curve (where throughput of the tiles 8 occurs at an unvarying rate of travel) is that tiles can be subjected to thermal gradients of a higher order than those which can normally be withstood when throughput of the tiles is continuous and effected at unvarying speed.

Figure 3:
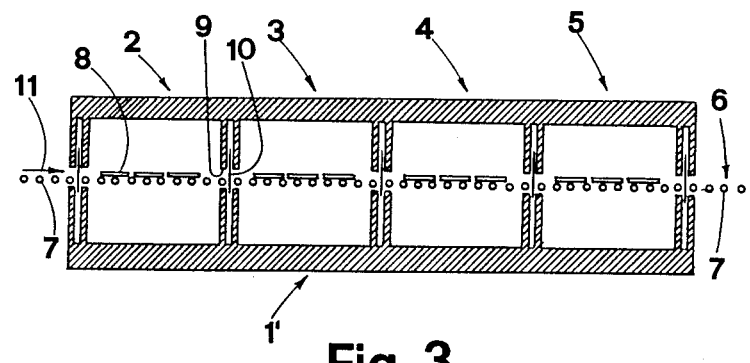
FIG. 3 is the schematic representation of a second embodiment of the kiln according to the invention, viewed in longitudinal section through a vertical plane.

Similar results are obtainable with the kiln 1' as illustrated in FIG. 3, which comprises a series of distinct treatment zones embodied separately one from the next, each held at a set temperature level. The zones in question, denoted 2, 3, 4 and 5, are arranged in a regular linear succession, each one independent of the remainder and provided with its own respective means of generating and controlling heat so that a given temperature can be maintained in each one. The zones are interconnected by way of a conveyor system that serves to effect high speed transfer of the material being fired from one zone to another, forward and backwards. Such a conveyor system consists in a roller table 6 identical to that in the embodiment of FIG. 1, and is of the type commonly installed in high speed roller kilns used for firing ceramic materials, tiles in particular. As in the case of the kiln shown in FIG. 1, the power driven rollers 7 will be operated by devices that permit of effecting a swift inversion of rotation for set durations, in order to produce the alternate forward and reverse movements 30 and 31.

The zones 2, 3, 4 and 5 of the kiln 1' of FIG. 3 communicate one with the next by way of openings 9 that can be closed off by shutter means, denoted 10. Different levels of heat will be maintained in the various zones, in such a way that the ceramic tiles being fired can be subjected to a sharp change in temperature when passing from one zone to the next. The extent of the single rises and falls, and the number effected, hence the number of zones installed in succession and making up the kiln 1', will depend ultimately on the characteristics of the material to be fired—i.e. tiles 8, in the case of the present disclosure. The change in temperature brought about at each stage will be based on the maximum variation to which the tile can be subjected without rupture occurring due to stresses generated by the thermal gradient induced in the body. Likewise, the duration of the tile's permanence in a given zone following the change in temperature will be determined (at all events, the minimum duration will be so determined) by the characteristics of the body, so as to enable a reduction in internal tension, as the temperature gradually stabilizes, of an order sufficient to make certain that no damage occurs to the tile. The rise and fall in temperature T occurring per unit time t internally of the kiln 1' is illustrated in the graph of FIG. 4, where the thermal cycle is depicted as a stepped curve; in this curve, the temperatures denoted T1, T2, T3 and T4 reflect the temperature levels maintained internally of the zones through which the tiles are conveyed in succession, rather than the temperature that registers in the body. During the heating (or cooling) phases of the cycle, each stabilization period that follows a given rise or fall in temperature T is relatively brief, and followed in its turn by at least one sharp cooling (or heating) step with a relatively short period at lower (or higher) temperature, before the next jump. A cycle of this type can be implemented with the kiln 1' of FIG. 3; for example, tiles 8 conveyed into zone 3 are left there for a brief period, and then quickly reversed back to zone 2, whereupon the next forward movement will take them straight through zone 3 and directly into zone 4. Accordingly, the movement of the tiles through this kiln 1' can also be represented by the same alternating succession of forward and reverse movements 30 and 31 as described for the first embodiment; similarly, each forward passage 30 whereby tiles are conveyed into a given zone, say zone 3, is followed by a reverse movement of shorter distance back into zone 2, this being followed once again by a longer forward movement 30 in which the tiles are taken at high speed through zone 3 and into zone 4.

The end result is the same in either of the two embodiments illustrated, namely, marked speeding up of the firing cycle, by virtue of the fact that the tiles 8 can be subjected to considerably steeper thermal gradients than is the case with a continuous throughput effected at constant speed.

What is claimed:

1. A method of firing ceramic materials comprising the steps of:
   (a) providing a kiln with an entrance, an exit and a heat treatment zone therebetween for a material to be heat treated;
   (b) heating said kiln;
   (c) introducing the material into said kiln;
   (d) conveying the material in a forward direction for a first distance;
   (e) conveying the material in a reverse direction for a second distance which is shorter than the first distance; and
   (f) repeating steps (d) and (e) until the material exits said kiln.

2. The method of claim 1 wherein said kiln comprises a series of sequentially connected treatment stages each of which is heated to a different temperature than each adjacent stage.

3. The method of claim 2 wherein each step (d) conveys the material to a different treatment stage than an immediately previous step (e).

4. The method of claim 2 wherein each step (e) conveys the material to a different treatment stage than an immediately previous step (d).

5. A method of firing ceramic materials, such as tiles and the like, comprising:
   (a) providing a kiln with a series of sequentially connected treatment stages, between an entrance and an exit, and a means for conveying a material to be heat treated through said series of treatment stages from said entrance to said exit;
   (b) heating each of said series of treatment stages to a different temperature than each adjacent treatment stage;
   (c) conveying the material with said means for conveying from said kiln entrance in a forward direction for a first distance;
   (d) conveying the material with said means for conveying in a reverse direction for a second distance which is shorter than said first distance; and,
   (e) repeating steps (c) and (d) until the material leaves said kiln at said exit.

6. The method of claim 5 wherein each step (c) conveys the material between two adjacent treatment stages.

7. The method of claim 5 wherein each step (d) conveys the material between two adjacent treatment stages.

* * * * *